US 7,688,761 B2

(12) United States Patent
Paramaguru

(10) Patent No.: US 7,688,761 B2
(45) Date of Patent: Mar. 30, 2010

(54) METHOD AND SYSTEM FOR CLASSIFYING PACKETS IN A NETWORK BASED ON META RULES

(75) Inventor: Parthibhan Paramaguru, Bangalore (IN)

(73) Assignee: Cisco Technology, Inc., San Jose, CA (US)

(*) Notice: Subject to any disclaimer, the term of this patent is extended or adjusted under 35 U.S.C. 154(b) by 816 days.

(21) Appl. No.: 11/501,586

(22) Filed: Aug. 9, 2006

(65) Prior Publication Data

US 2008/0037539 A1 Feb. 14, 2008

(51) Int. Cl.
*H04L 12/28* (2006.01)

(52) U.S. Cl. .................. 370/255; 370/389; 370/465; 709/225; 709/246; 717/107

(58) Field of Classification Search .................. None
See application file for complete search history.

(56) References Cited

U.S. PATENT DOCUMENTS

| | | | | |
|---|---|---|---|---|
| 5,920,717 | A * | 7/1999 | Noda | 717/104 |
| 6,651,096 | B1 * | 11/2003 | Gai et al. | 709/223 |
| 2004/0100956 | A1 * | 5/2004 | Watanabe | 370/389 |
| 2005/0198326 | A1 * | 9/2005 | Schlimmer et al. | 709/229 |

OTHER PUBLICATIONS

[RFC] Pankaj Gupta, Nick McKeown: Packet Classification on Multiple Fields. SIGC OMM 1999: 147-160.
[HiCut] Pankaj Gupta, Nick McKeown: Classifying Packets with Hierarchical Intelligent Cuttings. IEEE Micro 20(1): 34-41 (2000).
[HyperCut] Sumeet Singh, Florin Baboescu, George Varghese, Jia Wang: Packet classification using multidimensional cutting. SIGCOMM 2003: 213-224.
[ABV] Florin Baboescu, George Varghese: Scalable packet classification. SIGCOMM 2001: 199-210.
[L4] Venkatachary Srinivasan, George Varghese, Subhash Suri, Marcel Waldvogel: Fast and Scalable Layer Four Switching. SIGCOMM 1998: 191-202.
[BV] T. V. Lakshman, Dimitrios Stiliadis: High-Speed Policy-Based Packet Forwarding Using Efficient Multi-Dimensional Range Matching. SIGCOMM 1998: 203-214.

* cited by examiner

*Primary Examiner*—Chirag G Shah
*Assistant Examiner*—Salvador E Rivas
(74) *Attorney, Agent, or Firm*—Trellis IP Law Group, PC

(57) ABSTRACT

In one embodiment, a packet in a network is classified. A header of the packet includes various fields. Single-dimensional lookups are performed for each header field, based on a plurality of packet-classification rules. The results obtained from the single-dimensional lookups are merged to obtain a Resultant Bit Vector (RBV). Thereafter, the RBV is processed using a Finite State Machine (FSM), based on the plurality of packet-classification rules.

18 Claims, 12 Drawing Sheets

METHOD AND SYSTEM FOR CLASSIFYING PACKETS IN A NETWORK BASED ON META RULES

BACKGROUND OF THE INVENTION

1. Field of Invention

Embodiments of the present invention relate, in general, to networking. More specifically, the embodiments of the present invention relate to methods and systems for fast and scalable implementation of packet-classification rules in a network based on meta-rules.

2. Description of the Background Art

In a typical network, packets are classified, in part, to ensure Quality of Service (QoS), and to provide differentiated services to classified flows. Information relevant for classifying a packet is contained in a plurality of distinct header fields in the packet. The header fields are the portion of the packet that precedes the body, which contains the data. The header fields also contain data, such as source and destination addresses User Datagram Protocol (UDP), destination port, payload type, sequence number, timestamp, and other such details about the packet as well as control and timing information that are needed for successful transmission across the network. Examples of header fields include, but are not limited to, version, traffic class, flow label, payload length, next header, hop limit, source address, and destination address.

Routers that provide service differentiation functionality use packet classification as one of the primary methods for identifying packet flows. Upon receipt of a packet, the router uses packet-classification rules to analyze the information available in packet header fields. Other network devices, such as firewalls, use packet classification to determine packets that can pass and packets that are blocked.

In one conventional classification method, an Access Control List (ACL) format is used for packet classification. The ACL format classifies a packet on the basis of the Internet Protocol (IP) header typically relying on multi-dimensional lookup algorithm. The ACL format comprises an ordered list of Access Control Entries (ACEs) with the header fields forming an ACE that is bound by logical operator 'AND'. The process of using the ACL format is simple, as all the header fields forming the ACE are bound only by the logical operator 'AND'.

In other classification methods, the header fields that define the packet-classification rules are bound by the logical operators AND, OR and NOT. Moreover, the header fields may not have a fixed position and may only be recognizable by keywords that precede header field values. This leads to an undefined structure with no pre-determined logical relation. The undefined structure of the packet-classification rules requires additional router resources to identify and to classify packets.

In another conventional classification method, rules used for classification are based on multiple header fields across the OSI layers and provide flexibility to the packet classification process. These complex packet-classification rules, often referred to as meta-rules, include rules that may have an undefined structure and can use any other rule as a variable. With meta-rules, it is possible to have multiple levels of nested rules. Regardless of the levels of nesting, the innermost rules are referred to as leaf rules that are typically structured rules in the ACL format. Other nested meta-rules may have an undefined structure and take the shape of arbitrary complex logical expressions on the header fields. The use of the meta-rules requires yet more router resources to identify and to classify packets thereby slowing down the packet classification process. This computational burden reduces the transfer rate of network traffic.

Some packet-classification languages support multiple levels of nested rules or meta-rules. Algorithms that are known in the art for solving logical expressions are generic and do not meet the speed requirement of packet classification algorithms in present-day network applications. What is required is a method for solving arbitrary logical expressions for fast and scalable packet classification in a network environment.

DETAILED DESCRIPTION OF EMBODIMENTS OF THE INVENTION

Embodiments of the invention provide methods and systems for classifying packets, based on meta-rules. In the description herein for embodiments of the present invention, numerous specific details are provided, such as examples of components and/or methods, to provide a thorough understanding of embodiments of the present invention. One skilled in the relevant art will recognize, however, that an embodiment of the invention can be practiced without one or more of the specific details, or with other apparatuses, systems, assemblies, methods, components, materials, parts, and the like. In other instances, well-known structures, materials or operations are not specifically shown or described in detail to avoid obscuring aspects of embodiments of the present invention.

In a network environment, various network devices are connected to a network for communicating or transferring information from one network device to another. As used herein, network devices is a broad term that may include, by way of illustration, clients, servers or network infrastructure devices such as routers, switches, firewalls or other network devices. As is common practice, the information to be transferred is first converted into packets by a network device. Information relevant for classifying a packet is contained in a plurality of distinct header fields in the packet. Each packet also includes header fields comprising information that identifies, by way of example, the source address, the destination address, User Datagram Protocol (UDP), the destination port, payload type, sequence number, timestamp as well as control and timing information that is needed for successful transmission across the network. Examples of header fields include, but are not limited to, version, traffic class, flow label, payload length, next header, hop limit, source address, and destination address.

A router classifies the packet, based on packet-classification rules that are arbitrary logical expressions in the header fields. The present invention provides a meta-rules algorithm to generate a Resultant Bit Vector (RBV) for rules in an arbitrary logical expression format. To speed up single-dimensional lookups and to speed-up the merging of single-dimensional lookups, Aggregate Bit Vectors (ABV) are used.

A Finite State Machine (FSM), in one embodiment, is used to solve logical expressions, classify the packet and obtain a class identity for the packet. The FSM operates on RBV with operators defined for FSM that can handle bits corresponding to multiple match criteria in a single step. ABVs are used to jump across multiple match criteria or classes and FSM lookup provides class id and filter id matching the packet.

Figure 1:
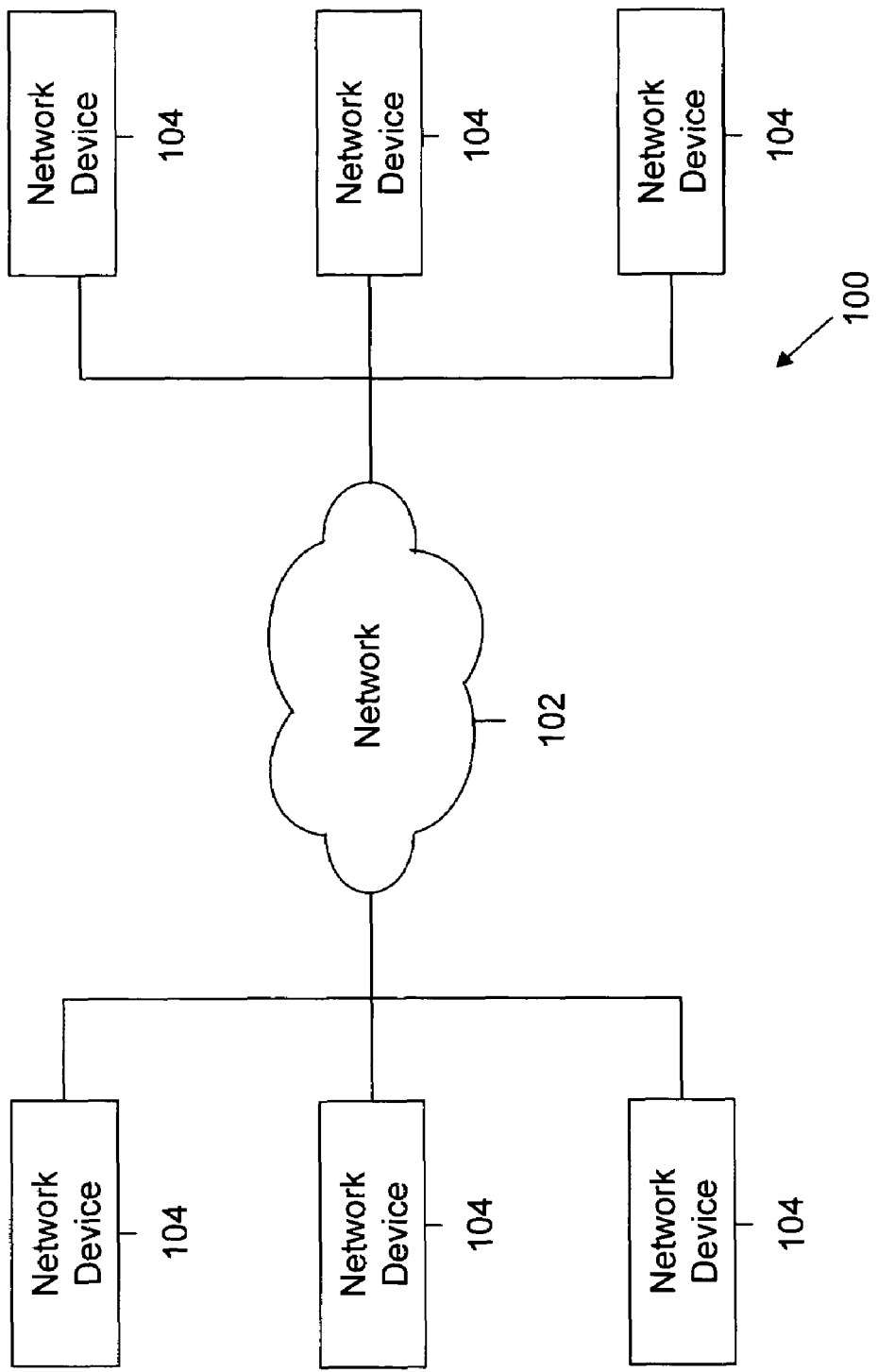
FIG. 1 illustrates a network environment wherein various embodiments of the present invention can be implemented.

Referring now to the drawings, particularly by their reference numbers, FIG. 1 illustrates a network environment 100, wherein various embodiments of the present invention can be implemented. The illustrated environment 100 comprises a network 102 and network devices 104. It is to be understood that the specific network configuration is for the reader's convenience and is not to be construed as limiting network 102 to a specific number of network devices 104 or to specific types of network devices present in network 102.

Examples of network 102 include, but are not limited to, Local Area Networks (LANs), Wide Area Networks (WANs), Metropolitan Area Networks (MANs), and Personal Area Networks (PANs). Network 102 may provide a physical or logical connection among network devices 104. For example, network 102 can implement this connection as a private leased line, a frame-relay circuit, a Virtual Private Network (VPN), and so forth. Network devices 104 share data and services across network 102 and can be connected by network 102 in various network topologies. Examples of the network topologies include mesh, star, ring, and bus topologies.

Each network device from network devices 104 can transmit and receive data. The data that is transmitted and received is in the form of packets. In accordance with embodiments of the present invention, network devices 104 provide different service differentiation functionality with packet classification being one of the primary methods for identifying the flow of packets. Rules used for packet classification are based on packet header fields from layer 2 and above. The packet-classification rules may include rules with an undefined structure, i.e., the packet header fields used in defining the rule may not have a pre-determined logical relation among them and are recognized by keywords preceding the field value. Using packet-classification rules, network devices 104 classify packets as belonging to a flow or a set of flows. The packet classification is subsequently used in various network applications such as, by way of example, at a firewall to determine if a packet is to be allowed to pass or to be dropped.

Figure 2:
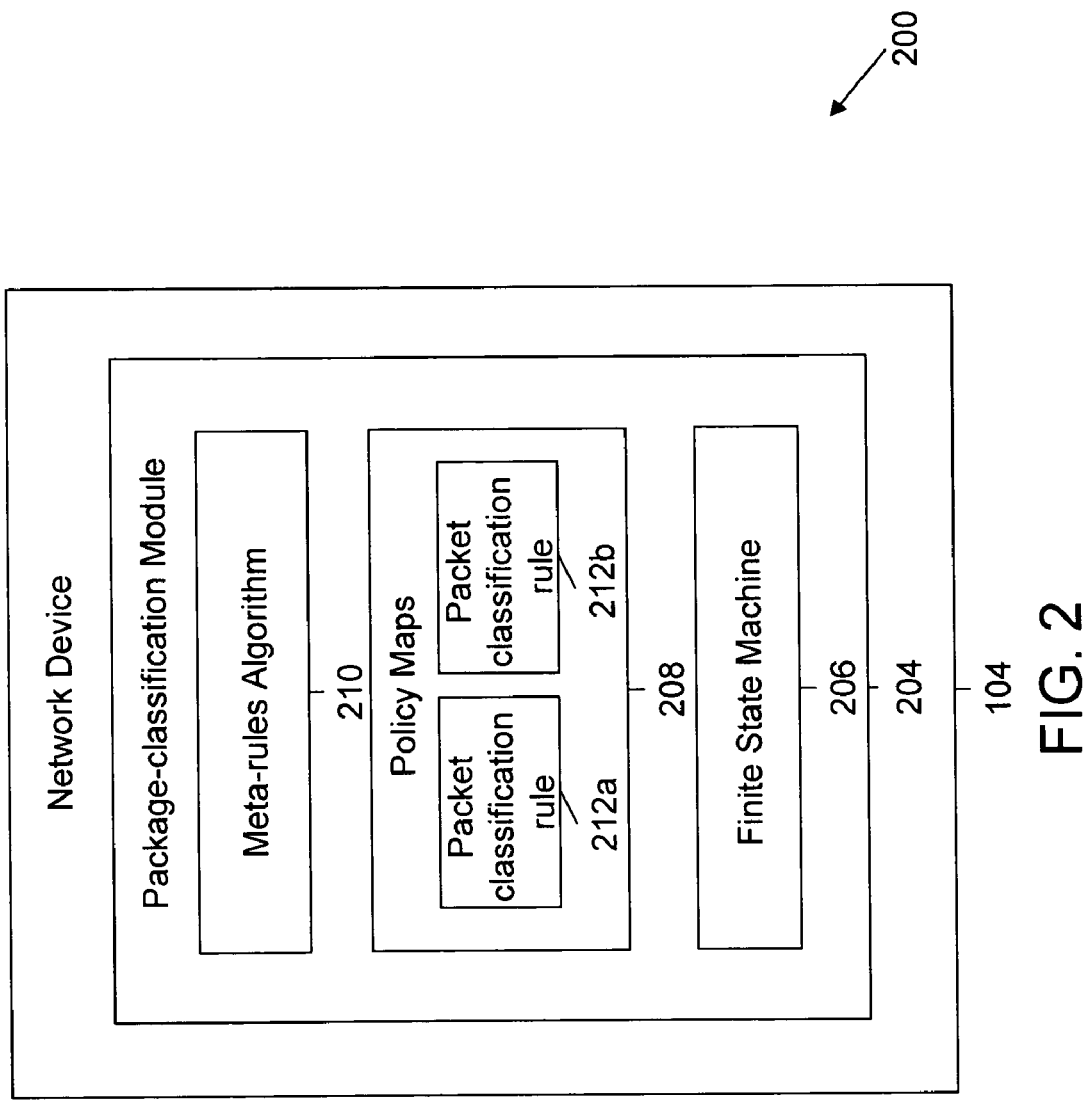
FIG. 2 illustrates various elements of a system for the classification of packets in a network in accordance with an embodiment of the present invention.

FIG. 2 illustrates a system 200 for rules-based classification of packets, in accordance with the present invention. System 200 includes packet-classification module 204, Finite State Machine (FSM) 206, policy maps 208, and meta-rules algorithm 210 associated with network device 104. Policy maps 208 includes packet-classification rules 212. In alternative embodiments, packet-classification module 204, FSM 206, policy maps 208, and meta-rules algorithm 210 are associated with a router.

Incoming packets are classified by packet-classification module 204 using meta-rules algorithm 210. Meta-rules algorithm 210 classifies incoming packets using meta-rules. The meta-rules are flexible rules that use other rules as a variable and contain information for using other rules. The meta-rules are also used to control the usage of rules in certain situations. The meta-rules include multiple levels of nested rules where a set of rules reside inside another set of rules. The innermost rules of the meta-rules are called leaf rules. These leaf rules are structured rules in an Access Control List (ACL) format and fields in the leaf rules are bound to each other by a logical AND operator. However, other nested meta-rules can have an undefined structure. Rules with an undefined structure can take the shape of arbitrary complex logical expressions.

Packet-classification module 204 classifies a packet, based on at least one header field. Examples of header fields include, but are not limited to, version, traffic class, flow label, payload length, next header, hop limit, source address, and destination address.

Packet-classification module 204 includes one or more policy maps 208. Policy maps 208 include the criteria upon which classification of packets is based. The criteria upon which classification of the packets is based are the packet-classification rules. Packet-classification rules 212 are in form of meta-rules. Policy maps 208 including packet-classification rules 212 are defined either by a user or at a system level by a network administrator. Meta-rules algorithm 210 included in packet-classification module 204 perform a lookup of header fields of packets and obtain equivalence classes for each header field. The equivalence classes are defined by policy maps 208 and represent a Bit Vector (BV) marked to indicate the rules that match the packet for a selected dimension. Details regarding the equivalent classes are explained in details in conjunction with FIGS. 4a and 4b.

Meta-rule algorithm 210 also generates a Resultant Bit Vector (RBV) for rules in an arbitrary logical expression format by merging BVs. However, to speed up single-dimensional lookups and to speed-up the merging of single-dimensional lookups, Aggregate Bit Vectors (ABVs) are used.

Figure 3:
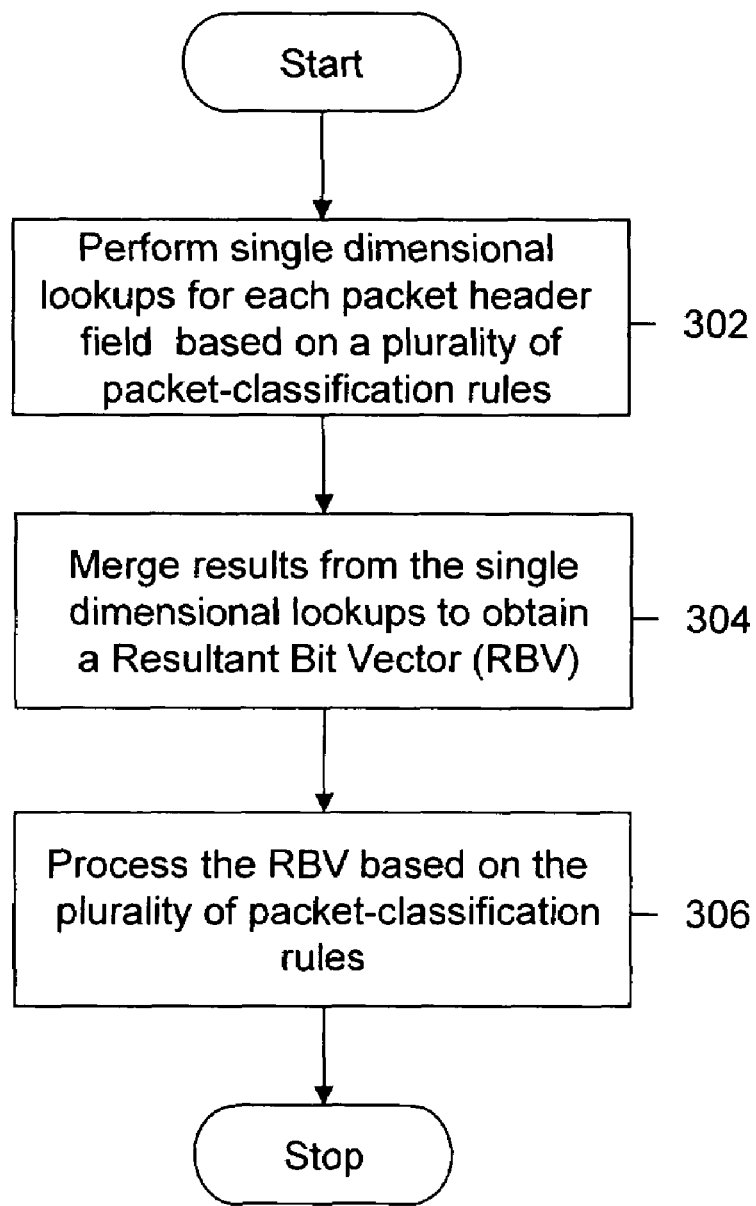
FIG. 3 is a flow diagram illustrating a method for the classification of packets in a network in accordance with an embodiment of the present invention.

FIG. 3 is a flow diagram illustrating a method for the classification of packets in a network, in accordance with an embodiment of the present invention. Bit vector (BV) schemes can be used alone or can be used in conjunction with Aggregated Bit Vector (ABV) scheme for providing practical and scalable solutions for problems related to ACL classification. In both BV and BV with ABV schemes, each header field that is used for packet classification is treated as one dimension. Meta-rules algorithm 210 builds a separate set of equivalence class for each of the packet-header dimensions such that every packet falls into exactly one equivalence class for that dimension. Each equivalence class is represented as a BV marked with the rules that match the packet for that dimension. Meta-rules algorithm 210 identifies the equivalence class for the packet in each dimension by using meta-rules. The innermost rules of the meta-rules are called leaf rules. These leaf rules are structured rules in the ACL format and the fields in the leaf rules are bound to each other by a logical AND operator. Meta-rules algorithm 210 performs 'AND' operation to merge BVs that correspond to different fields of a single leaf rule. Meta-rules algorithm 210 later performs 'OR' operations on all identified BVs to obtain an RBV. Meta-rules algorithm 210 processes the RBV using FSM 206. This approach of using the RBV and FSM 206 in combination quickly solves the logical expression. The use of the BV scheme in conjunction with the ABV scheme is based on the observation that any given packet matches a maximum of eight to nine rules from a database of thousands of rules. Therefore, any given packet typically matches only a small subset of the larger database of rules. The use of BV scheme in conjunction with the ABV scheme makes the method for the classification of the packets in the network faster.

Accordingly at 302, package-classification module 204 traverses fields of a packet-header to obtain equivalent classes corresponding to each field. Each equivalent class is represented by a BV. The equivalent classes are defined by policy maps 210 included in packet-classification module 204. Policy maps 208 may be used to implement firewall rules for enhanced security by dropping packets that do not have a defined class. At 304, package-classification module 204 merges all Bit Vectors (BVs) representing the equivalent classes to obtain a Resultant Bit Vector (RBV). Thereafter, at 306, the RBV is processed in finite state machine 206, to obtain a packet class. The packet class includes a packet-class identity and a packet-field identity. Subsequently, router 202 performs an action on each packet based on the packet class.

Figure 4A:
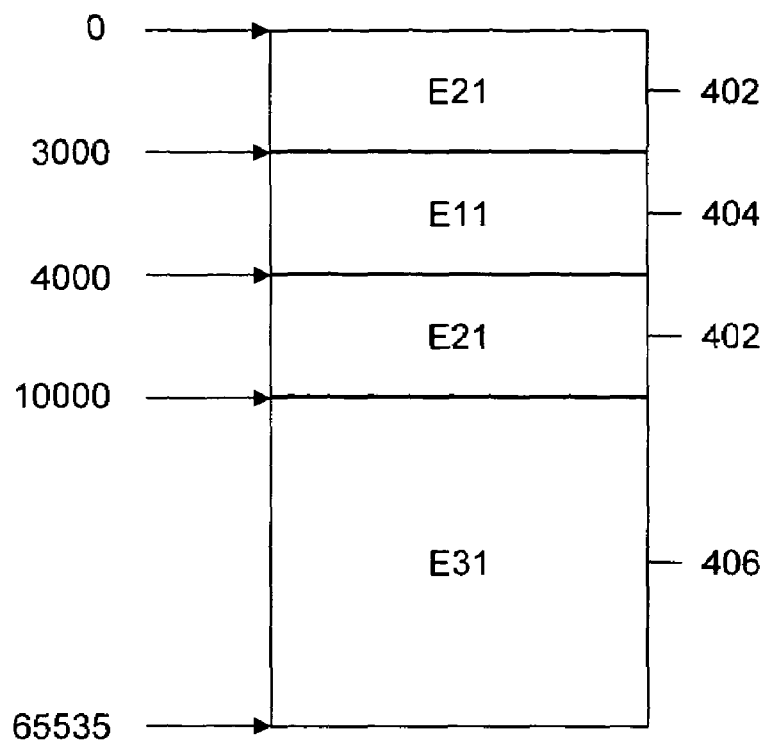
FIGS. 4a and 4b illustrate a data structure in accordance with an embodiment of the present invention.
Figure 4B:
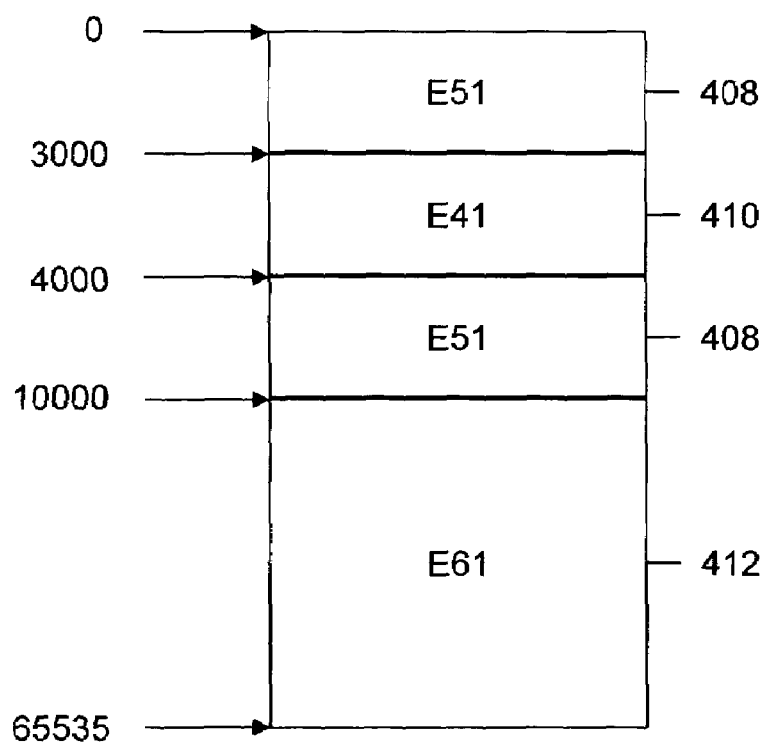

FIGS. 4a and 4b illustrate data structures, in accordance with an embodiment of the present invention. The data structures implement policy maps 208 to obtain equivalence classes for header fields. Consider, for example, a policy map as given below:

```
Class-map type access-control match-all foo-class1
    Match field TCP source-port range 3000 4000
    Match field TCP dest-port range 3000 4000
Class-map type access-control match-any foo-class2
    Match field TCP source-port range 0 10000
    Match field TCP dest-port range 0 10000
Policy-map type access-control foo-child
    Class foo-class1
        Log
    Class foo-class2
        Send-response
    Class class-default
        Drop
Policy-map type access-control foo
    Class ip_tcp
        Service-policy foo-child
```

The logical expression for the above policy map is:
If (x1 and x4) then {Log} else
If (x2 or x5) then {send icmp message}
else {drop}

Where,
$x1$=(src-port>=3000) AND (src-port<=4000)
$x2$=(src-port>=0) AND (src-port<=10000)
$x3$=(src-port>=0) AND (src-port<=65535)
$x4$=(dest-port>=3000) AND (dest-port<=4000)
$x5$=(dest-port>=0) AND (dest-port<=10000)
$x6$=(dest-port>=0) AND (dest-port<=65535)

In the above exemplary policy map, foo is an exemplary name for a class.

Let us consider, for example, a header field comprising source-port field and destination-port field. When the above policy map is implemented in the data structure of FIG. 4a, equivalence classes E21 402, E11 404, and E31 406 are obtained for the source-port field. Source ports that are in the same equivalence class, map on to a common set of rules. Source ports ranging from 3000 to 3999 are represented by E11 404. Source ports in the range 0 to 2999 and 4000 to 9999 are represented by E21 402. Source ports that are from 10000 to 65535 are represented by E31 406.

Therefore, E11 404, E21 402, and E31 406 can be computed as:
E11 404={x1, x4, x2, x5, x3, x6}=101010;
E21 402={x1, x4, x2, x5, x3, x6}=001010; and
E31 406={x1, x4, x2, x5, x3, x6}=000010.

Bit 1 represents a true condition, while bit 0 represents a false condition. For representing equivalence classes, in case of E21 402, 'E' refers to an equivalence class, '2' refers to Class foo-class2 for source-port field of the policy map, and '1' refers to the data structure of FIG. 4a. Similarly, in case of E11 404, 'E' refers to the equivalence class, '1' refers to Class foo-class1 for source-port field of the policy map, and '1' refers to the data structure of FIG. 4a. In case of E31 406, 'E' refers to the equivalence class, '3' refers to Class class-default for source-port field of the policy map, and '1' refers to the data structure of FIG. 4a. Position of variables x1, x2, x3, x4, x5, and, x6 in the ordered set E11 404, E21 402, and E31 406 is same as the order in which variables appear in a logical expression. In the logical expression, variable x4 comes before variable x2 and hence, variable x4 is placed before x2 in the BV for equivalence class E11 404, E21 402, and E31 406. Similarly, the other variables x1, x3, x5 and x6 are positioned in the BV. Positioning of variables in BV is such that all bits required for single state transition in FSM are placed in consecutive position.

Similarly, when the same policy map is implemented in the data structure of FIG. 4b, equivalence classes E51 408, E41 410, and E61 412 are obtained for the destination-port field. Destination ports that are in the same equivalence class, map on to a common set of rules. Destination ports in the range 3000 to 3999 are represented by E41 410. Destination ports in the range 0 to 2999 and 4000 to 9999 are represented by E51 408. Destination ports in the range 10000 to 65535 are represented by E61 412. Therefore, E41 410, E51 408, and E61 412 can be computed as:
E41 410={x1, x4, x2, x5, x3, x6}=010101;
E51 408={x1, x4, x2, x5, x3, x6}=000101; and
E61 412={x1, x4, x2, x5, x3, x6}=000001.

Bit 1 represents a true condition, while bit 0 represents a false condition.

The data structure of FIG. 4a comprises an array of a size equal to a maximum source-port size. The array is split into segments to define the equivalence classes for the source-port field. The array in data structure of FIG. 4a is indexed by the source-port fields of the packet headers. To illustrate, if source-port of a packet is 3500, a lookup results in obtaining E11 404 as an equivalence class for the packet.

Similarly, the data structure of FIG. 4b comprises an array of a size equal to a maximum destination-port size. The array is split into segments to define the equivalence classes of the destination-port field. The array in data structure of FIG. 4b is indexed by the destination-port fields of the packet headers. To illustrate, if the destination port of a packet is 3500, a lookup results in obtaining E41 410 as an equivalence class for the packet.

Data structures of FIGS. 4a and 4b support a faster lookup for equivalence classes and consume 256 kilobytes for a field size of 16 bits. Each entry in the data structure is 4 byte long and is used for storing pointer to BV. Memory consumption by the data structures of FIGS. 4a and 4b is to accommodate a one-to-one matching of the source ports and the destination ports.

Figure 5A:
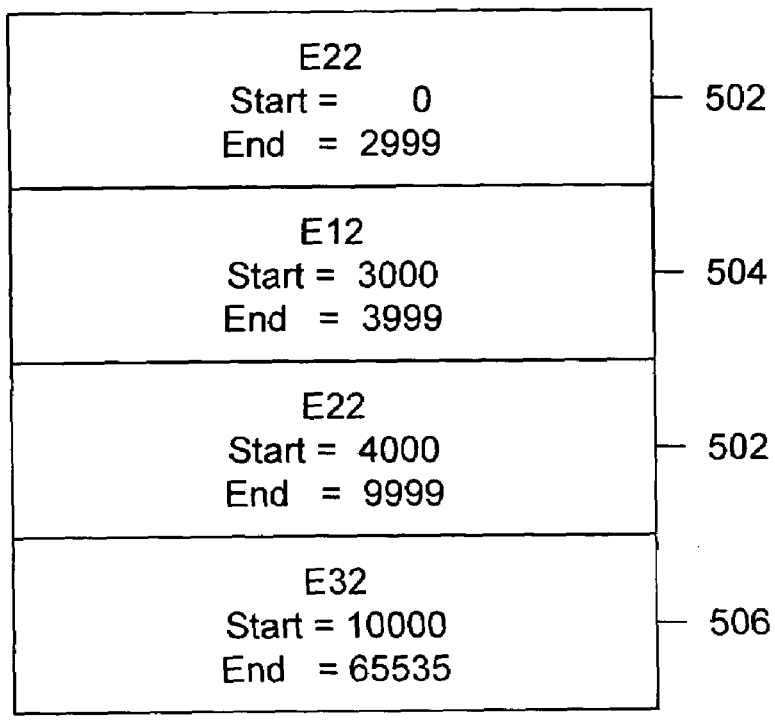
FIGS. 5a and 5b illustrate a data structure in accordance with another embodiment of the present invention.
Figure 5B:
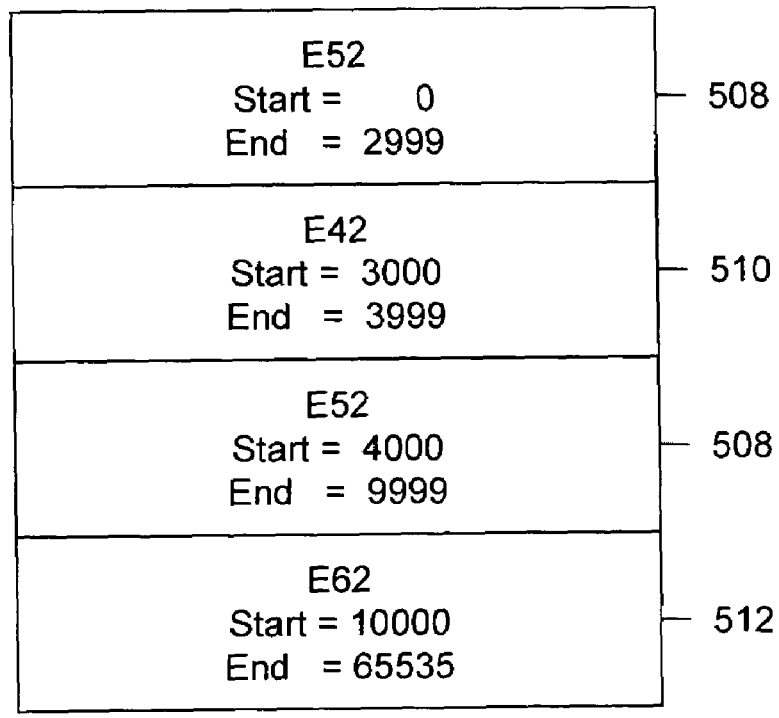

FIGS. 5a and 5b illustrate data structures, in accordance with another embodiment of the present invention. Data structures of FIGS. 5a and 5b can also be used for implementing the above policy map. The data structures of FIGS. 5a and 5b comprise an array that equals the number of regions generated for obtaining the equivalence classes.

For the policy map described in FIG. 4, the number of regions generated for the source port is four, i.e., E22 502, E12 504, and E32 506, wherein E22 502 includes two distinct segments. For example, in case of E22 502, 'E' refers to an equivalence class, '2' refers to Class foo-class2 for source-port field of the policy map, and '2' refers to the data structure of FIG. 5a. Similarly, in case of E12 504, 'E' refers to the equivalence class, '1' refers to Class foo-class1 for source-port field of the policy map, and '2' refers to the data structure of FIG. 5a. In case of E32 506, 'E' refers to the equivalence class, '3' refers to Class class-default for source-port field of the policy map, and '2' refers to the data structure of FIG. 5a. Data structure of FIG. 5a marks the beginning and the end of each region for the source port. For example, E22 502 starts at 0 and ends at 2999 for the first range, E12 504 starts at 3000 and ends at 3999 for the second range, E22 502 starts at 4000 and ends at 9999 for the third range, and E32 506 starts at 10000 and ends at 65535 for the fourth range.

Similarly, for the same policy map as described in FIGS. 4a and 4b, the number of regions generated for the destination port is four, i.e., E52 508, E42 510, and E62 512, here E52 508 includes two distinct segments. For example, in case of E52 508, 'E' refers to an equivalence class, '5' refers to Class foo-class2 for destination-port field of the policy map, and '2' refers to the data structure of FIG. 5b. Similarly, in case of E42 510, 'E' refers to the equivalence class, '4' refers to Class foo-class1 for destination-port field of the policy map, and '2' refers to the data structure of FIG. 5b. In case of E62 512, 'E' refers to the equivalence class, '6' refers to Class class-default for destination-port field of the policy map, and '2' refers to the data structure of FIG. 5b. The data structure of FIG. 5b marks the beginning and the end of each region of the destination port. For example, E52 508 starts at 0 and ends at 2999 for the first range, E42 510 starts at 3000 and ends at 3999 for the second range, E52 508 starts at 4000 and ends at 9999 for the third range, and E62 506 starts at 10000 and ends at 65535 for the fourth range.

Packet-classification module 204 performs a series of lookups to generate equivalence classes for each dimension of a packet. The dimension of a packet is determined by the header field. For example, a packet with 'd' header fields will have 'd' dimensions. After packet-classification module 204 performs a series of lookups, equivalence classes corresponding to each header field are obtained. Each equivalence class is represented by a BV. Thereafter, packet-classification module 104 merges all BVs obtained to form an RBV. For the above-mentioned policy map, if the source port of a packet is 3500, a lookup results in obtaining E11 404 as an equivalence class for the packet. Similarly, if destination port of a packet is 3500, a lookup results in obtaining E41 410 as an equivalence class for the packet. To obtain the RBV, E11 404 requires to be merged with E41 410. For example, E11 404=101010 and

E41 410=010101.

Therefore, RBV=(E11 404) OR (E41 410)=111111. The RBV obtained is then processed in FSM 206.

Figure 6:
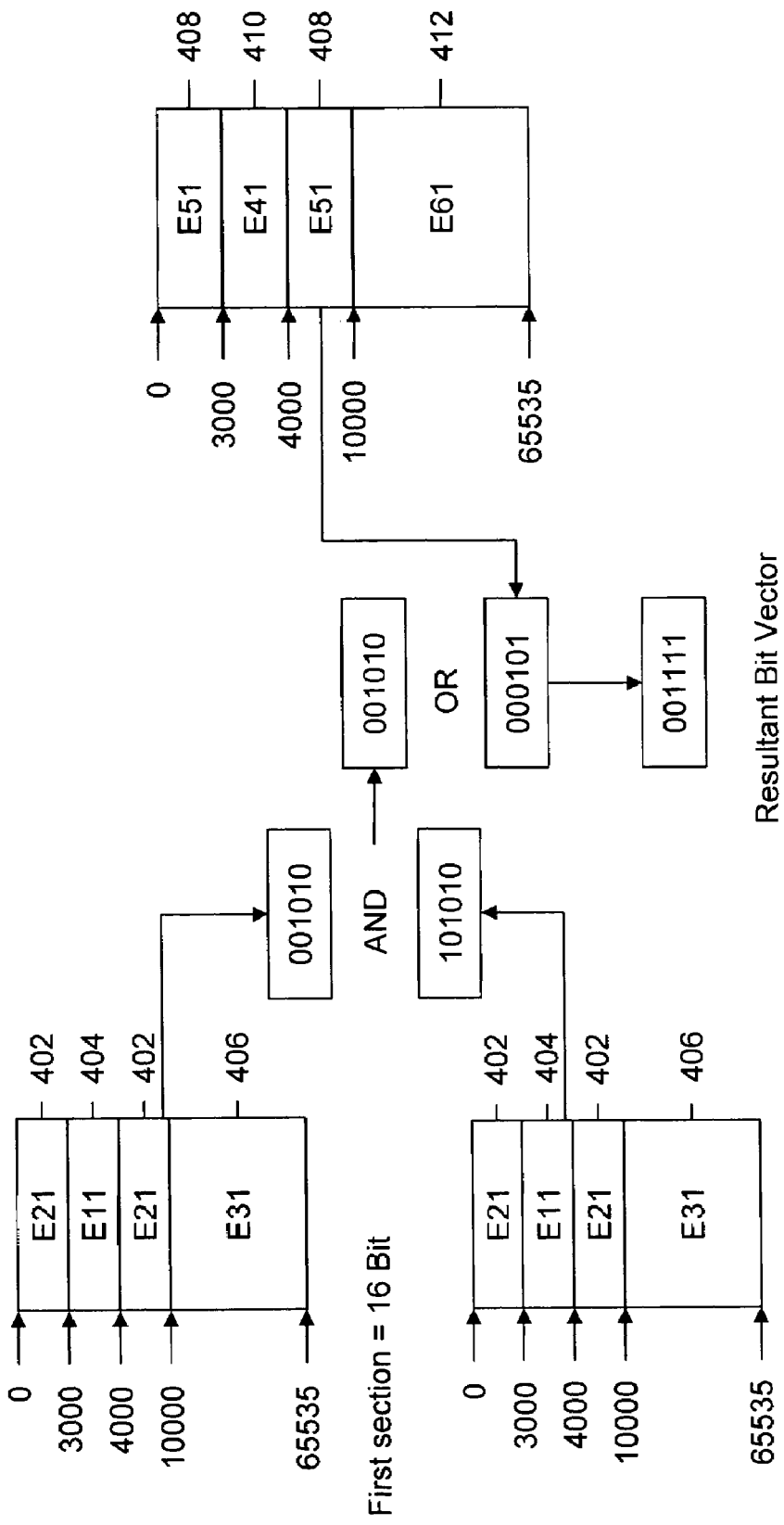
FIG. 6 illustrates data structures for obtaining a Resultant Bit Vector (RBV) in accordance with an embodiment of the present invention.

FIG. 6 illustrates data structures for obtaining an RBV, in accordance with an embodiment of the present invention. Equivalence classes for long header fields are generated by packet-classification module 204. Examples of long header fields include, but are not limited to, Internet Protocol version 4 (IPv4) address, Internet Protocol version 6 (IPv6) address, and Ethernet Media Access Control (MAC) address. Packet-classification module 204 divides a long header field into smaller field sections and performs single dimensional lookups for each of the smaller field sections. In an embodiment of the invention, the long header field is divided into smaller field sections, as matching the long header field is expensive. Subsequently, section-bit vectors obtained corresponding to the smaller field sections are merged, based on a logical AND operator to obtain a single-bit vector. The single-bit vector that is obtained on merging the smaller field sections corresponds to the long header field. Consider, for example, a long packet header source IP address with a size of 32 bits. The long packet header source IP-address field is divided into two sections of 16 bits each. Packet-classification module 204 performs a lookup for the first and the second sections of 16 bits, to obtain corresponding equivalence classes. Each equivalence class corresponding to a section of 16 bits is represented by a section-bit vector. Let us assume that the section-bit vector for the first section is 001010 and the section-bit vector for the second section is 101010. Therefore, two section-bit vectors are obtained for the first and the second sections that are 16 bits each. Subsequently, the two section-bit vectors are merged by the logical AND operator to obtain a single-bit vector 001010. The single-bit vector 001010 that is obtained corresponds to the long packet header source IP address with the size of 32 bits. Similarly, packet-classification module 204 performs a lookup for a destination port 4500 of size 16 bits. A BV 000101 is obtained. The single-bit vector 001010 is ORed with the BV 000101 to obtain an RBV 00111.

Figure 7:
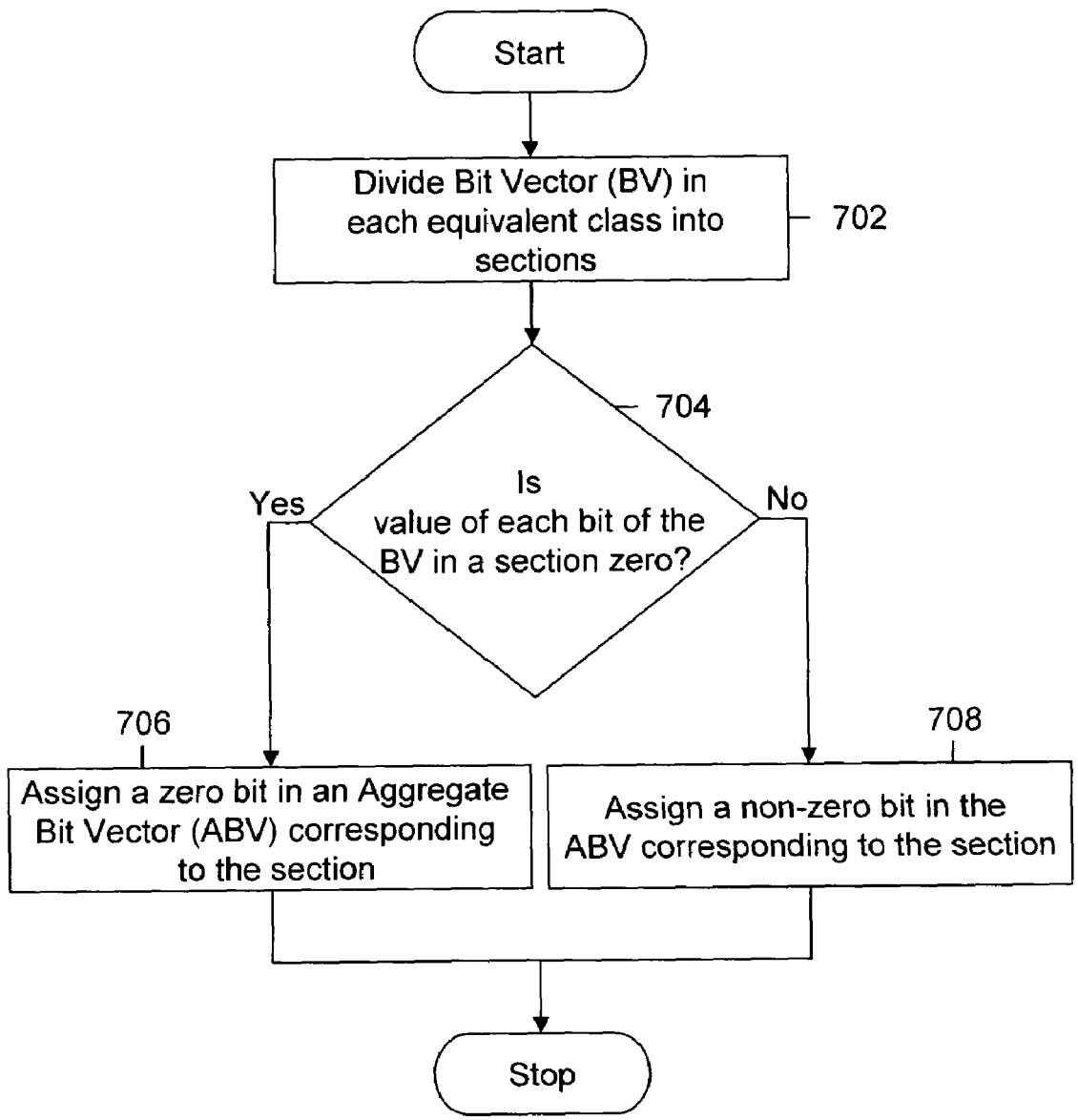
FIG. 7 is a flow diagram illustrating a method for representing a Bit Vector (BV) by an Aggregate Bit Vector (ABV) in accordance with an embodiment of the present invention.

FIG. 7 is a flow diagram, illustrating a method for representing a BV by an ABV, in accordance with an embodiment of the present invention. ABVs are used for representing BVs in order to speed up a process of obtaining an RBV for the BVs. At 702, packet-classification module 204 divides a BV corresponding to an equivalence class into sections. The total length of the sections is either user-defined or system-defined. At 704, packet-classification module 204 checks whether the value of each bit of a section of a BV is zero. If the value of each bit of the section of the BV is zero, then, 706 is performed. At 706, a zero-bit is assigned to the ABV corresponding to the section. If the value of at least one bit of the section of the BV is not zero, 708 is performed. At 708, a non-zero is assigned to the ABV corresponding to the section. For all the sections of the BV, 704 to 708 are performed. A complete ABV represents all the sections of the BV. Thereafter, a set of ABVs is obtained, wherein each ABV corresponds to a BV.

Figure 8:
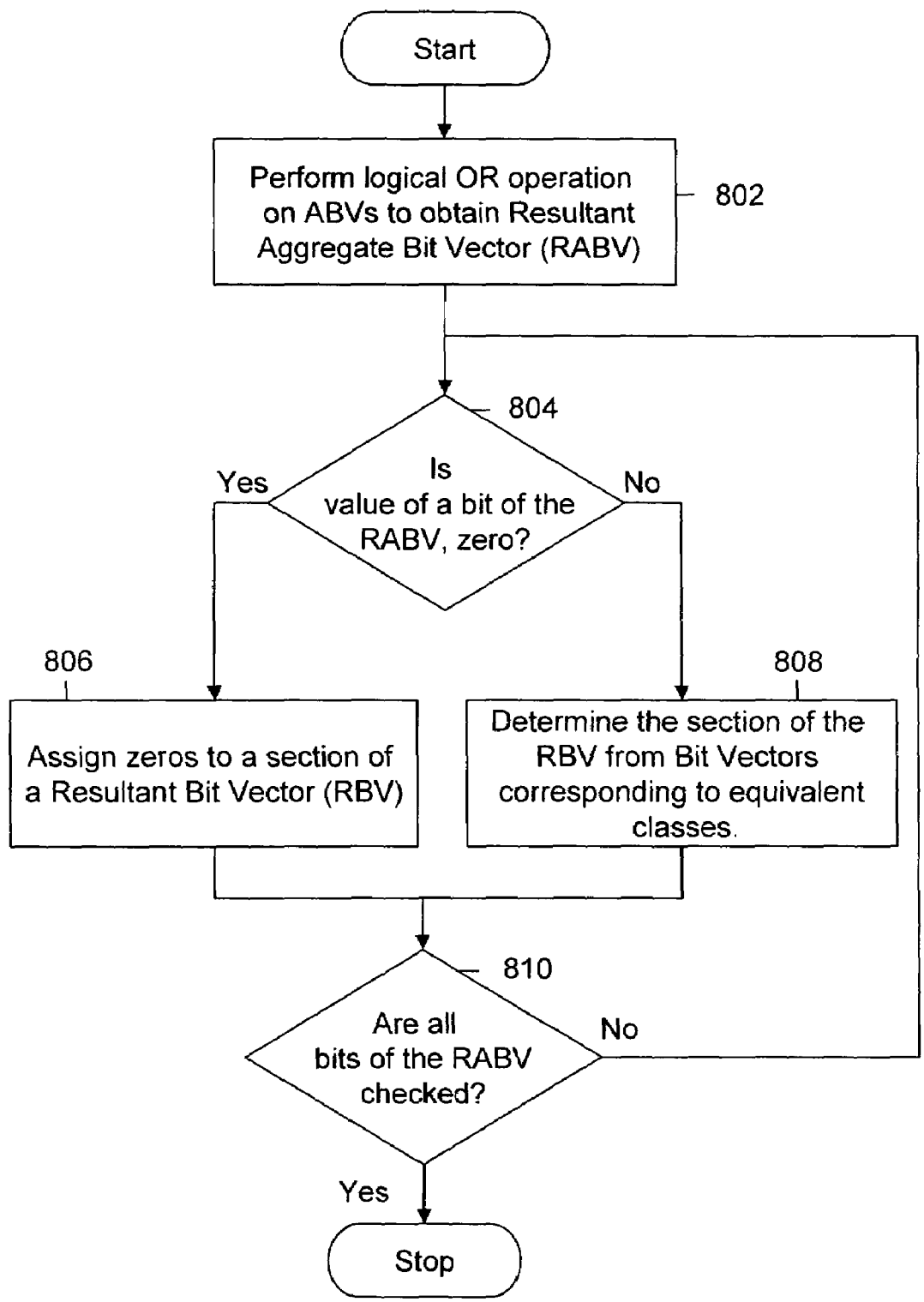
FIG. 8 is a flow diagram illustrating a method for constructing an RBV from individual header field equivalence classes in accordance with an embodiment of the present invention.

FIG. 8 is a flow diagram, illustrating a method for constructing an RBV from individual header field equivalence classes, in accordance with an embodiment of the present invention. Each BV corresponding to an equivalence class is represented by an ABV. At 802, packet-classification module 204 performs a logical OR operation to merge ABVs to obtain a Resultant Aggregate Bit Vector (RABV). At 804, packet-classification module 204 checks whether the value of a bit of the RABV is zero. If the value of the bit is zero, 806 is performed. Thereafter, at 806, packet-classification module 204 assigns zeros to a section in the RBV corresponding to the bit in the ABV. If the value of the bit is not zero, then, 808 is performed. At 808, packet-classification module 204 determines the section of the RBV by logically ORing corresponding sections of BVs that are represented by the ABVs. Subsequently, at 810, packet-classification module 204 determines whether all the bits in the RABV have been checked. If all the bits of the RABV are not checked, 804 to 810 are repeated for each bit of the RABV. Once all the bits are checked and 804 to 810 are performed on each bit, the RBV is determined. The RABV is used to speed up the process of obtaining the RBV. Consider, for example, a set of 1000 rules. ABV scheme is based on an assumption that out of the 1000 rules, a packet matches a maximum of 8 to 9 rules. Therefore, if the value of a bit in the RABV is zero, no time is wasted on obtaining the corresponding sections of BVs as they include only zeros.

Figure 9:
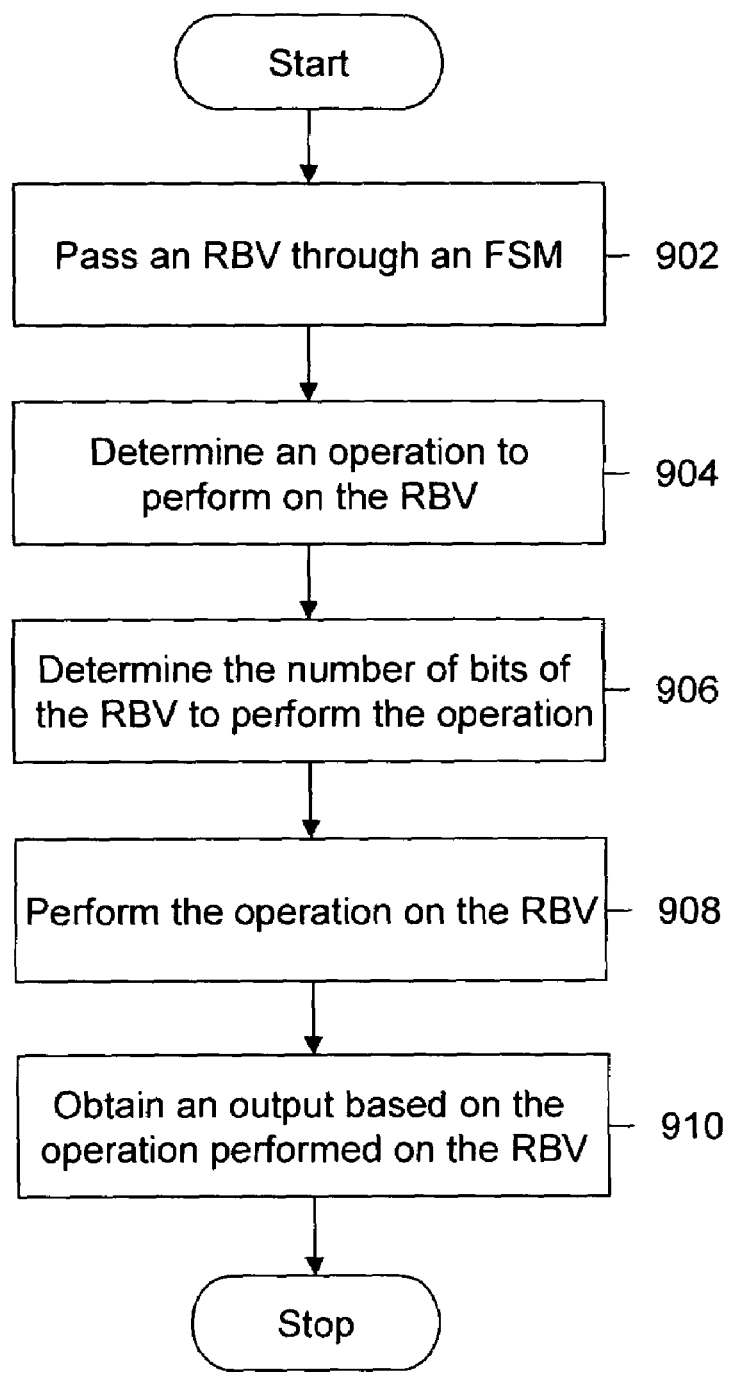
FIG. 9 is a flow diagram illustrating a method for processing an RBV in a Finite State Machine (FSM) in accordance with an embodiment of the present invention.

FIG. 9 is a flow diagram, illustrating a method for processing an RBV in FSM 206, in accordance with an embodiment of the present invention. In an embodiment of the present invention, FSM 206 comprises fields such as Operator (OP), Size (SZ), Positive Transition State (PASS), Negative Transition State (FAIL), PASS Offset (POFFSET), and FAIL Offset (FOFFSET). At 902, the RBV passes through FSM 206. At 904, FSM 206 determines an operation to be performed on the RBV. The FSM field OP operator defines the operation to be performed on the RBV. At 906, FSM 206 determines the number of bits of the RBV on which the operation is performed. FSM 206 determines the number of bits of the RBV, based on the value of the FSM field SZ. Henceforth, the bits of the RBV, on which the operation is performed, are referred to as SZ bits. At 908, FSM 206 performs the operation on the RBV. The operation is performed based on an AND operator, an OR operator, a NO operator, an AGG operator, and an UNKNOWN operator.

The AND operator is a logical AND operator. The AND operator checks if all the SZ bits of the RBV are 1. FSM 206 moves to a PASS state, if all the SZ bits are 1. If all the SZ bits are not 1, FSM 206 moves to a FAIL state. For example, pseudo code for the AND operator is:

If ((RBV[i] & mask)==mask) then {RBV head+=(SZ+ POFFSET); move to pass state}
else {RBV head+=(SZ+FOFFSET); move to fail state}

Where, [i] is the current index of head of the RBV, wherein the head of the RBV gives the position of FSM 206 on the RBV and mask is a variable with corresponding SZ bits set to 1 and remaining bits set to 0.

The OR operator is a logical OR operator that checks if any of the SZ bits of the RBV is 1. FSM 206 moves to a PASS state, if any of the SZ bits is 1. If none of SZ bits is 1, FSM 206 moves to a FAIL state. For example, pseudo code for the OR operator is:

If (RBV[i] & mask) then {RBV head +=(SZ+POFFSET); move to pass state}
else {RBV head+=(SZ+FOFFSET); move to fail state}

The AGG operator processes the RABV. The RBV is divided into sections. This division is explained in detail in conjunction with FIG. 7. Each section is represented by a bit in the RABV. If all the bits in a section are 0, then 0 is assigned in the RABV to represent the section. If at least one of the bits in the section is not 0, 1 is assigned in the RABV to represent the section. The AGG operator uses the RABV to decrease the traversal performed by FSM 206. For example, pseudo code for the AGG operator is:

If (!RBV[i]) then {RBV head+=(SZ+POFFSET), move to pass state}
else {move to fail state}

The UNKNOWN operator is used by FSM 206 for handling complex expressions. Complex expressions require special match criteria. The special match criteria include, but are not limited to, expressions on packet payload, arithmetic operations, and long-string matching. In an embodiment of the present invention, the UNKNOWN is calculated on a module outside FSM 206, which transfers control to the external module for processing the UNKNOWN operator.

In accordance with various embodiments of the present invention, the RBV passes through FSM 206, based on the following FSM field measures: Size (SZ), PASS Offset (POFFSET), and FAIL Offset (FOFFSET). The FSM field SZ determines the number of bits of the RBV that are required for performing the operation. The FSM fields POFFSET and FOFFSET are logical jump operators. In case of a PASS transition, the FSM field POFFSET defines the control of a logical jump of the head of the RBV. In case of a FAIL transition, the FSM field FOFFSET defines the control of a logical jump of the head of the RBV.

At 910, FSM 206 obtains an output based on the operation performed on the RBV. In an embodiment of the present invention, the output provides packet-class identity and packet-filter identity of the packet. The packet-class identity and the packet-filter identity of the packet are obtained by FSM 206 by using packet-classification rules. Thereafter, network device 104 can log, send-response, or drop packets, based on the policy map and packet-class identity or packet-filter identity. Therefore, the RBV is processed in FSM 206 to obtain the packet-class identity and the packet-filter identity, thereby classifying the packet.

Figure 10:
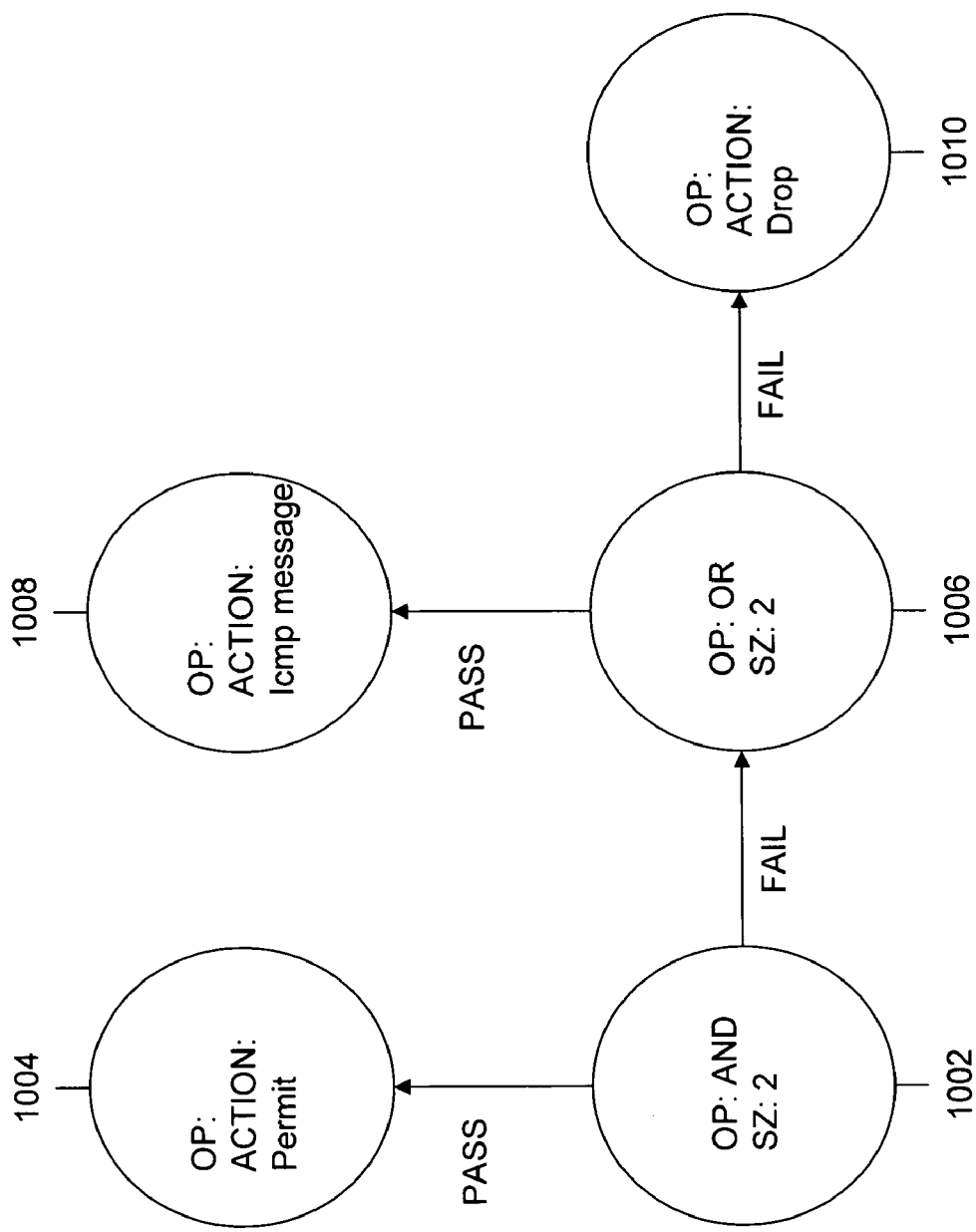
FIG. 10 illustrates a process of packet classification in accordance with an embodiment of the present invention.

FIG. 10 illustrates a process of packet classification, in accordance with an embodiment of the present invention. A packet is classified by processing an RBV corresponding to the packet in an FSM. The processing is explained, based on the exemplary policy-map described in conjunction with FIGS. 4a and 4b:

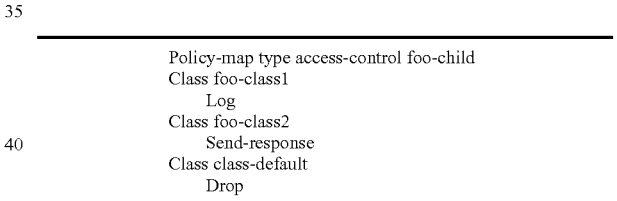

At state 1002, FSM 206 reads values of FSM fields OP and SZ. The value of OP is ANDed and the value of SZ is 2. Thereafter, FSM 206 performs an operation on the first two bits of an RBV, based on the AND operator. If the first two bits of the RBV are 1, then the condition for Class foo-class1 of Policy-map is satisfied and FSM 206 attains a PASS. Thereafter, FSM 206 transits to state 1004. At state 1004, value of ACTION is Permit and a packet corresponding to the RBV is permitted to be logged according to Policy-map type access-control for Class foo-class1. In accordance with an embodiment of the present invention, a copy of the packet header information is made when the packet is permitted to be logged. If any of the first two bits of the RBV is not 1, then the condition for Class foo-class1 of Policy-map is not satisfied and FSM 206 attains a FAIL. Thereafter, FSM 206 transits to state 1006. At state 1006, FSM 206 reads values of FSM fields OP and SZ. The value of OP is OR and the value of SZ is 2. Thereafter, FSM 206 performs an operation on the third and fourth bits of the RBV, based on the OR operator. If any of the third and fourth bits of the RBV is 1, the condition for Class foo-class2 of Policy-map is satisfied and FSM 206 attains a PASS. Thereafter, FSM 206 transits to state 1008. At state 1008, value of ACTION is Icmp message. A message is sent with regard to the packet in the network according to Policy-map type access-control for Class foo-class2. In accordance with an embodiment of the present invention, the Icmp message is an error message. If the third and fourth bits of the RBV are 0, the condition for Class foo-class2 of Policy-map is not satisfied and FSM 206 attains a FAIL. Thereafter, FSM 206 transits to state 1010. At state 1010, value of ACTION is DROP. Consequently, the packet corresponding to the RBV belongs to Class class-default and the packet is dropped by network device 104 as per Policy-map type access-control for Class class-default.

Figure 11:
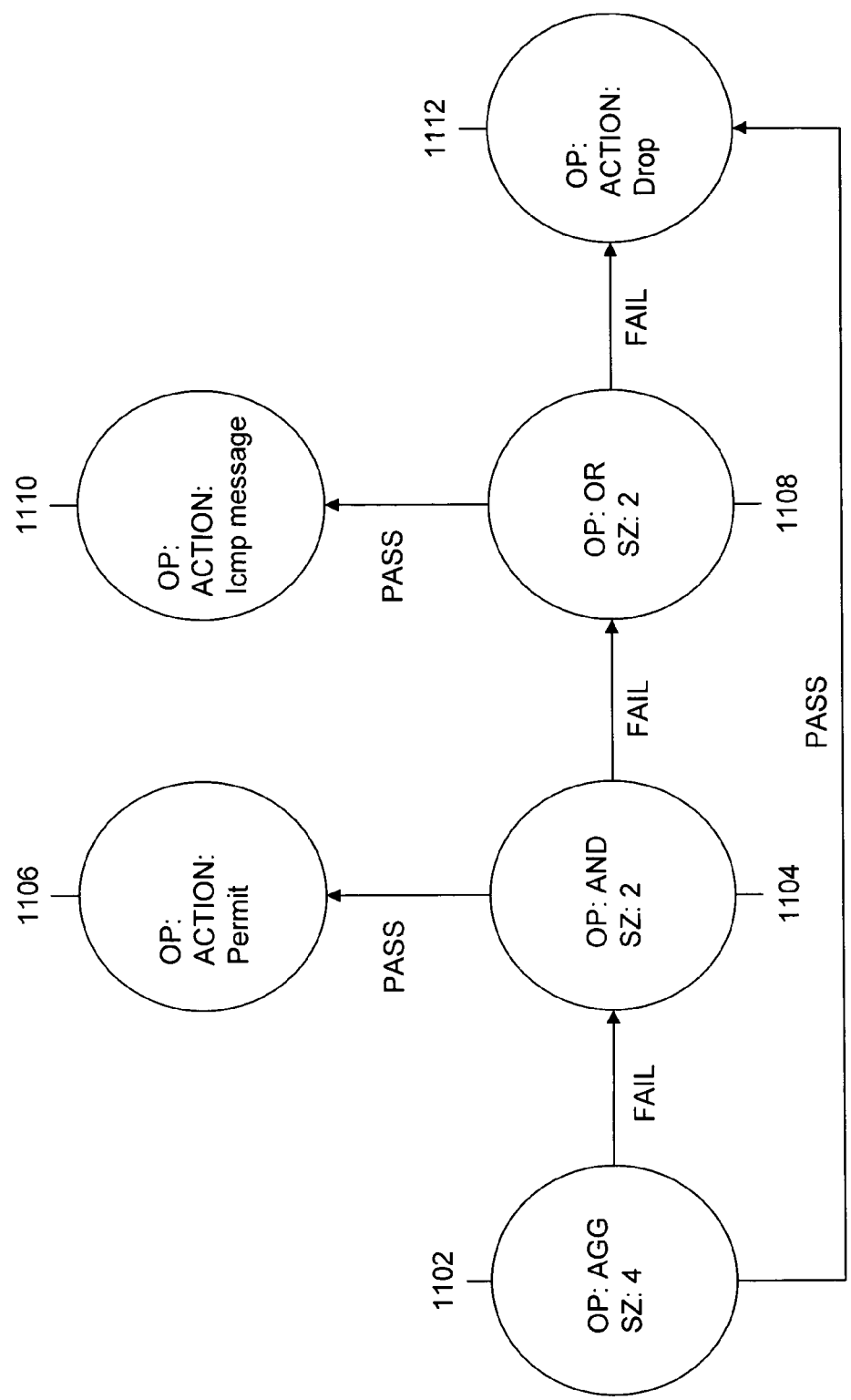
FIG. 11 illustrates a process of packet classification in accordance with another embodiment of the present invention.

FIG. 11 illustrates a process of packet classification, in accordance with another embodiment of the present invention. A packet is classified by processing an RBV corresponding to the packet in an FSM. The processing is explained, based on the exemplary policy-map described in conjunction with FIGS. 4a and 4b, and on the exemplary policy-map type access control described in conjunction with FIG. 9.

At state 1102, FSM 206 reads values of FSM fields OP and SZ. The value of OP is AGG and the value of SZ is 4. Thereafter, FSM 206 performs an operation on the first four bits of an RBV, based on the AGG operator. FSM 206 checks if all the four bits are 0. In case all the four bits are 0, FSM 206 attains a PASS and transits to state 1112 directly instead of traversing all intermediate states. If any of the four bits have a value other than 0, FSM 206 attains a FAIL and transits to state 1104.

At state 1104, FSM 206 reads values of FSM fields OP and SZ. The value of OP is AND and the value of SZ is 2. Thereafter, FSM 206 performs an operation on the first two bits of an RBV, based on the AND operator. If the first two bits of the RBV are 1, then the condition for Class foo-class1 of Policy-map is satisfied and FSM 206 attains a PASS. Thereafter, FSM 206 transits to state 1106. At state 1106, value of ACTION is Permit. Therefore, a packet corresponding to the RBV is permitted to be logged according to Policy-map type access-control for Class foo-class1.

In accordance with an embodiment of the present invention, a copy of the packet header information is made when the packet is permitted to be logged. If any of the first two bits of the RBV is not 1, then the condition for Class foo-class1 of Policy-map is not satisfied and FSM 206 attains a FAIL. Thereafter, FSM 206 transits to state 1108. At state 1108, FSM 206 reads values of FSM fields OP and SZ. The value of OP is OR and the value of SZ is 2. Thereafter, FSM 206 performs an operation on the third and fourth bits of the RBV, based on the OR operator. If any of the third and fourth bits of the RBV is 1, then the condition for Class foo-class2 of Policy-map is satisfied and FSM 206 attains a PASS. Thereafter, FSM 206 transits to state 1110. At state 1110, value of ACTION is Icmp message. Therefore, a message is sent regarding the packet to the network according to Policy-map type access-control for Class foo-class2. In accordance with an embodiment of the present invention, the Icmp message is an error message. If the third and fourth bits of the RBV are 0, then the condition for Class foo-class2 of Policy-map is not satisfied and FSM 206 attains a FAIL. Thereafter, FSM 206 transits to state 1112. At state 1112, value of ACTION is DROP. Therefore, the packet corresponding to the RBV belongs to Class class-default and the packet is dropped by network device 104, according to Policy-map type access-control for Class class-default.

Figure 12:
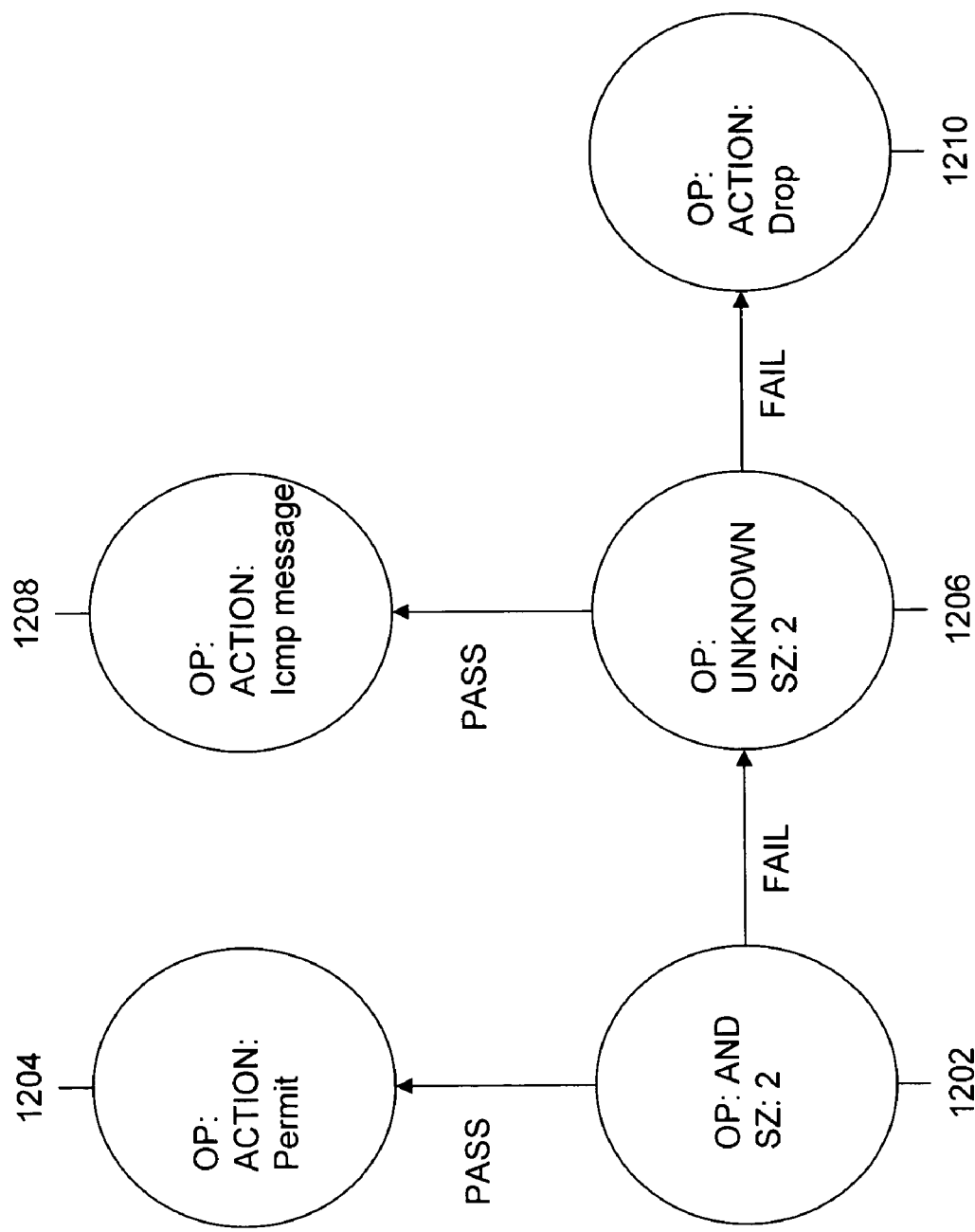
FIG. 12 illustrates a process of packet classification in accordance with an embodiment of the present invention.

FIG. 12 illustrates a process of packet classification, in accordance with an embodiment of the present invention. A packet is classified by processing an RBV corresponding to the packet in an FSM. The processing is explained, based on the exemplary policy-map described in conjunction with FIGS. 4a and 4b, and on the exemplary policy map type access control described in conjunction with FIG. 9.

FSM 206 reads values of FSM fields OP and SZ at state 1202. The value of OP is AND and the value of SZ is 2. Thereafter, FSM 206 performs an operation on the first two bits of an RBV, based on the AND operator. If the first two bits of the RBV are 1, then the condition for Class foo-class1 of Policy-map is satisfied and FSM 206 attains a PASS. Thereafter, FSM 206 transits to state 1204. At state 1204, value of ACTION is Permit Therefore, a packet corresponding to the RBV is permitted to be logged according to Policy-map type access-control for Class foo-class1. In accordance with an embodiment of the present invention, a copy of the packet header information is made when the packet is permitted to be logged. If any of the first two bits of the RBV is not 1, then the condition for Class foo-class1 of Policy-map is not satisfied and FSM 206 attains a FAIL. Thereafter, FSM 206 transits to state 1206. At state 1206, FSM 206 reads values of FSM fields OP and SZ. The value of OP is UNKNOWN and the value of SZ is 2. Thereafter, FSM 206 transfers its control to an external module, wherein the operation is performed on the third and fourth bits of the RBV, based on the UNKNOWN operator. The external module, executing the UNKNOWN operator type, reads the packet payload data or other information stored in system data structure for processing. The external module is not bound by the information provided in the RBV. Once the operation is performed, the control returns to FSM 206. If the condition for Class foo-class2 of Policy-map is satisfied, FSM 206 attains a PASS. Thereafter, FSM 206 transits to state 1208. At state 1208, value of ACTION is Icmp message. Therefore, a message is sent regarding the packet to the network, according to Policy-map type access-control for Class foo-class2. In accordance with an embodiment of the present invention, the Icmp message is an error message. If the condition for Class foo-class2 of Policy-map is not satisfied, FSM 206 attains a FAIL. Thereafter, FSM 206 transits to state 1210. At state 1210, value of ACTION is DROP. Therefore, the packet corresponding to the RBV belongs to Class class-default and the packet is dropped by network device 104, according to Policy-map type access-control for Class class-default.

In an embodiment of the present invention, network device 104 supports multiple policy maps. Packet-classification module 206 re-uses a data structure used in a single dimensional lookup for the multiple policy maps. Packet-classification module 206 computes on an ABV and an RBV for a portion corresponding to a policy map that is under consideration. Each policy map from the multiple policy maps is supported by a separate FSM.

In an embodiment of the present invention, packet-classification module 206 implements a Meta Rule Caching (MRC) algorithm on selected policy maps. The MRC algorithm splits the multi-dimensional space of the packet header into a pre-determined number of fields. The pre-determined number equals the number of dimensions of the packet-classification rules. Thereafter, a set of equivalence classes are obtained for each of the pre-determined number of fields. From the set of equivalence classes generated for each of the pre-determined number of fields, a unique equivalence class is obtained, which matches each of the pre-determined number of fields. Thereafter, a cross product of all unique equivalence classes is obtained. Cross product of equivalence classes results in formation of a next level of equivalence classes. The cross product is used for classifying packets based on the unstructured part of the packet-classification rules. Therefore, packets that have the identical packet classification result are grouped under the same equivalence class. In the MRC algorithm, a first packet falling in an equivalence class takes a longer time for packet classification, wherein a logical expression is solved. Thereafter, classification of subsequent packets falling in the same equivalence class is accelerated. Meta-rules algorithm 210 explained in the present invention is used to speed up the logical expression solving in the MRC algorithm. Usage of the present invention in solving logical expression would reduce the time taken by the MRC algorithm for the first packet falling in an equivalence class.

The method provided by various embodiments of the present invention is used for classification of packets in a network. The method provided by various embodiments of the present invention is not to be construed to be limited to any specific method of classifying packets in a network.

In accordance with various embodiments of the present invention, a system for classification of a packet in a network is provided. The system includes a network device, wherein the network device includes means for traversing fields of the packet to obtain equivalence classes, wherein each equivalence class comprises a set of BVs corresponding to each field; means for merging the equivalence classes to obtain an RBV; means for processing the RBV in an FSM, wherein the processing is performed based on a plurality of packet-classification rules.

According to an embodiment of the present invention, a method for improving packet classification is provided. The method comprises performing single dimensional lookups for each header field based on a plurality of packet-classification rules; merging results from the single dimensional lookups to obtain an RBV; and processing the RBV based on the plurality of packet-classification rules to determine a packet classification.

Various embodiments of the present invention provide a non-transitory computer readable storage medium that includes instructions for improving packet classification executable by a processor. One or more of these instructions are for performing single dimensional lookups for each header field based on a plurality of packet-classification rules. Other instructions are for merging results from the single dimensional lookups to obtain an RBV. Still other instructions are for processing the RBV based on the plurality of packet-classification rules to determine a packet classification.

Various embodiments of the present invention classify a packet, based on packet-classification rules 212, which are meta-rules. Network device 104 uses FSM 206 to implement the meta-rules. Packet-classification module 204 classifies a packet, based on header fields. The header fields that define packet-classification rules 212 are logically related by multiple logical operators such as AND, OR and NOT. Moreover, the header fields do not have a fixed position and are recognized by keywords that precede header field values. This leads to an undefined structure of packet-classification rules 212. Subsequently, the structure of packet-classification rules 212 can be defined by using the meta-rules. The meta-rules can then take shape of arbitrary logical expressions. FSM 206 is capable of handling such arbitrary logical expressions and uses an UNKNOWN operator to resolve the arbitrary logical expressions that are not handled well by FSM in a fast and scalable manner.

Although the invention has been discussed with respect to specific embodiments thereof, these embodiments are merely illustrative, and not restrictive, of the present invention. For example, a "method for classification of a packet in a network" can include any type of analysis, manual or automatic, to anticipate the needs of the networks.

Although specific protocols have been used to describe embodiments, other embodiments can use other transmission protocols or standards. Use of the terms 'peer', 'client', and 'server' can include any type of device, operation, or other process. The present invention can operate between any two processes or entities including users, devices, functional systems, or combinations of hardware and software. Peer-to-peer networks and any other networks or systems where the roles of client and server are switched, change dynamically, or are not even present, are within the scope of the invention.

Any suitable programming language can be used to implement the routines of the present invention including C, C++, Java, assembly language, etc. Different programming techniques such as procedural or object oriented can be employed. The routines can execute on a single processing device or multiple processors. Although the steps, operations, or computations may be presented in a specific order, this order may be changed in different embodiments. In some embodiments, multiples shown sequentially in this specification can be performed at the same time. The sequence of operations described herein can be interrupted, suspended, or otherwise controlled by another process, such as an operating system, kernel, etc. The routines can operate in an operating system environment or as stand-alone routines occupying all, or a substantial part, of the system processing.

In the description herein for embodiments of the present invention, numerous specific details are provided, such as examples of components and/or methods, to provide a thorough understanding of embodiments of the present invention. One skilled in the relevant art will recognize, however, that an embodiment of the invention can be practiced without one or more of the specific details, or with other apparatus, systems, assemblies, methods, components, materials, parts, and/or the like. In other instances, well-known structures, materials, or operations are not specifically shown or described in detail to avoid obscuring aspects of embodiments of the present invention.

Also in the description herein for embodiments of the present invention, a portion of the disclosure recited in the specification contains material, which is subject to copyright protection. Computer program source code, object code, instructions, text or other functional information that is executable by a machine may be included in an appendix, tables, figures or in other forms. The copyright owner has no objection to the facsimile reproduction of the specification as filed in the Patent and Trademark Office. Otherwise all copyright rights are reserved.

Reference throughout this specification to "one embodiment", "an embodiment", or "a specific embodiment" means that a particular feature, structure, or characteristic described in connection with the embodiment is included in at least one embodiment of the present invention and not necessarily in all embodiments. Thus, respective appearances of the phrases "in one embodiment", "in an embodiment", or "in a specific embodiment" in various places throughout this specification are not necessarily referring to the same embodiment. Furthermore, the particular features, structures, or characteristics of any specific embodiment of the present invention may be combined in any suitable manner with one or more other embodiments. It is to be understood that other variations and modifications of the embodiments of the present invention described and illustrated herein are possible in light of the teachings herein and are to be considered as part of the spirit and scope of the present invention.

Further, at least some of the components of an embodiment of the invention may be implemented by using a programmed general-purpose digital computer, by using application specific integrated circuits, programmable logic devices, or field programmable gate arrays, or by using a network of interconnected components and circuits. Connections may be wired, wireless, by modem, and the like.

It will also be appreciated that one or more of the elements depicted in the drawings/figures can also be implemented in a more separated or integrated manner, or even removed or rendered as inoperable in certain cases, as is useful in accordance with a particular application.

Additionally, any signal arrows in the drawings/Figures should be considered only as exemplary, and not limiting, unless otherwise specifically noted. Combinations of components ors will also be considered as being noted, where terminology is foreseen as rendering the ability to separate or combine is unclear.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The foregoing description of illustrated embodiments of the present invention, including what is described in the abstract, is not intended to be exhaustive or to limit the invention to the precise forms disclosed herein. While specific embodiments of, and examples for, the invention are described herein for illustrative purposes only, various equivalent modifications are possible within the spirit and scope of the present invention, as those skilled in the relevant art will recognize and appreciate. As indicated, these modifications may be made to the present invention in light of the foregoing description of illustrated embodiments of the present invention and are to be included within the spirit and scope of the present invention.

Thus, while the present invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the present invention. It is intended that the invention not be limited to the particular terms used in following claims and/or to the particular embodiment disclosed as the best mode contemplated for carrying out this invention, but that the invention will include any and all embodiments and equivalents falling within the scope of the appended claims.

Also in the description herein for embodiments of the present invention, a portion of the disclosure recited in the specification may contain material, which is subject to copyright protection. The copyright owner has no objection to the facsimile reproduction of the specification as filed in the Patent and Trademark Office. Otherwise all copyright rights are reserved.

What is claimed is:

1. A method for improving packet classification in a network device, the method comprising:
   performing single dimensional lookups for each header field based on a plurality of packet-classification rules, by a network device, wherein performing the single dimensional lookups comprises obtaining a Bit Vector (BV) for each header field;
   merging results from the single dimensional lookups and merging a plurality of equivalence classes to obtain a Resultant Bit Vector (RBV);
   processing the RBV based on the plurality of packet-classification rules to determine a packet classification;
   dividing each bit vector in each equivalence class into sections; representing each section by a bit in an Aggregate Bit Vector (ABV);
   assigning a non-zero bit in the ABV corresponding to the section, if a value of at least one bit in the section is not zero;
   assigning a zero bit in the ABV corresponding to the section, if a value of each bit in the section is zero;
   performing a logical OR operation on ABV corresponding to each equivalence class to obtain a Resultant Aggregate Bit Vector (RABV);
   determining a section of the RBV by logically ORing corresponding sections of equivalence classes, if a value of a bit of the RABV corresponding to the section is not zero; and
   assigning zeros to the section of the RBV, if a value of the bit of the RABV corresponding to the section is zero.

2. The method of claim 1, wherein the performing the single dimensional lookups for a large header field comprises:
   dividing the large header field into smaller sections;
   performing single dimensional lookups for each of the smaller sections; and
   merging results from the single dimensional lookups to obtain an equivalence class for the large header field.

3. The method of claim 1, wherein the processing the RBV is based on meta-rules.

4. The method of claim 1, further comprising:
   determining a data structure that provides an equivalence class; and
   associating Bit Vectors (BY) with the equivalence class.

5. The method of claim 4, wherein the associating the BV for the equivalence class comprises:
   identifying the packet-classification rules that match the packets in the equivalence class;
   obtaining a bit for each matching packet-classification rule; and
   positioning the bits in the BY corresponding to the matching packet classification rule, wherein the bits are arranged in an ordered set based on a logical expression.

6. The method of claim 1, wherein the processing the RBV comprises:
   passing the RBV through a Finite State Machine (FSM) based on an FSM field pass-offset (POFFSET) and an FSM field fail-offset (FOFFSLT);
   determining an operation to be performed on the RBV based on an FSM field operator (OP);
   determining a number of bits of the RBV to perform the operation based on value of an FSM field size (SZ);
   performing the operation on the RBV; and
   obtaining an output based on the operation that is performed on the RBV.

7. The method of claim 6, wherein the operation performed on the RBV is any one of: an 'AND' operator, an 'OR' operator, a 'NO' operator, an 'AGG' operator, and an 'UNKNOWN' operator.

8. A system for classification of a packet in a network device, the system comprising:
   means for traversing fields of the packet to obtain equivalence classes, each equivalence class comprising a set of Bit Vectors (BVs) corresponding to each field;

means for merging the equivalence classes to obtain a Resultant Bit Vector (RBV); and a Finite State Machine (FSM), the FSM comprising:
  means for processing the RBV based on a plurality of packet-classification rules;
  means for passing the RBV through the FSM based on an FSM field pass-offset (POFFSET) and an FSM field fail-offset (FOFFSLT);
  means for determining an operation to be performed on the RBV based on an FSM field operator (OP);
  means for determining a number of bits of the RBV to perform the operation based on value of an FSM field size (SZ);
  means for performing the operation on the RBV; and
  means for obtaining an output based on the operation that is performed on the RBV.

9. The system of claim 8, wherein the means for performing the operation on the RBV comprises:
  means for performing an 'AND' operation;
  means for performing an 'OR' operation;
  means for performing a 'NO' operation;
  means for performing an 'AGG' operation; and
  means for performing an 'UNKNOWN' operation.

10. The system of claim 8, further comprising one or more policy maps.

11. A non-transitory computer readable storage medium including instructions for improving packet classification, the instructions being executable by a processor, the non-transitory computer readable storage medium comprising:
  one or more instructions for performing single dimensional lookups for each header field based on a plurality of packet-classification rules, wherein the performing the single dimensional lookups comprises obtaining a Bit Vector (BV) for each header field;
  one or more instructions for merging results from the single dimensional lookups and merging a plurality of equivalence classes to obtain a Resultant Bit Vector (RBV);
  one or more instructions for processing the RBV based on the plurality of packet-classification rules to determine a packet classification;
  one or more instructions for dividing each bit vector in each equivalence class into sections;
  one or more instructions for representing each section by a bit in an Aggregate Bit Vector (ABV);
  one or more instructions for assigning a non-zero bit in the ABV corresponding to the section, if a value of at least one bit in the section is not zero;
  one or more instructions for assigning a zero bit in the ABV corresponding to the section, if a value of each bit in the section is zero;
  one or more instructions for performing a logical OR operation on ABV corresponding to each equivalence class to obtain a Resultant Aggregate Bit Vector (RABV);
  one or more instructions for determining a section of the RBV by logically ORing corresponding sections of equivalence classes, if a value of a bit of the RABV corresponding to the section is not zero; and
  one or more instructions for assigning zeros to the section of the RBV, if a value of the bit of the RABV corresponding to the section is zero.

12. A method for classifying packets in a network device, the method comprising:
  performing, by a network device, single dimensional lookups for each header field based on a plurality of packet-classification rules;
  merging results from the single dimensional lookups to obtain a Resultant Bit Vector (RBV); and
  processing the RBV based on the plurality of packet-classification rules to determine a packet classification, wherein the processing the RBV comprises:
    passing the RBV through a Finite State Machine (FSM) based on an FSM field pass-offset (POFFSET) and an FSM field fail-offset (FOFFSET);
    determining an operation to be performed on the RBV based on an FSM field operator (OP);
    determining a number of bits of the RBV to perform the operation based on value of an FSM field size (SZ);
    performing the operation on the RBV; and
    obtaining an output based on the operation that is performed on the RBV.

13. The method of claim 12, wherein the network device comprises a router.

14. The method of claim 12, wherein the performing the operation on the RBV comprises performing an 'AND' operation.

15. The method of claim 12, wherein the performing the operation on the RBV comprises performing an 'OR' operation.

16. The method of claim 12, wherein the performing the operation on the RBV comprises performing a 'NO' operation.

17. The method of claim 12, wherein the performing the operation on the RBV comprises performing an 'AGG' operation.

18. The method of claim 12, wherein the performing the operation on the RBV comprises performing an 'UNKNOWN' operation.

* * * * *